(12) United States Patent
Taranta et al.

(10) Patent No.: US 11,493,684 B2
(45) Date of Patent: Nov. 8, 2022

(54) RESONANT FIBRE OPTIC GYROSCOPES USING HOLLOW CORE OPTICAL FIBRE AND METHODS THEREOF

(71) Applicant: University of Southampton, Southampton (GB)

(72) Inventors: Austin Taranta, Scottsdale, AZ (US); Eric Numkam-Fokoua, Southampton (GB); Francesco Poletti, Southampton (GB); David Neil Payne, Southampton (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 17/266,408

(22) PCT Filed: Aug. 5, 2019

(86) PCT No.: PCT/GB2019/052189
§ 371 (c)(1),
(2) Date: Feb. 5, 2021

(87) PCT Pub. No.: WO2020/030894
PCT Pub. Date: Feb. 13, 2020

(65) Prior Publication Data
US 2021/0311248 A1 Oct. 7, 2021

(30) Foreign Application Priority Data
Aug. 6, 2018 (GB) ...................................... 1812744

(51) Int. Cl.
*G02B 6/02* (2006.01)
*G01C 19/72* (2006.01)

(52) U.S. Cl.
CPC ..... *G02B 6/02328* (2013.01); *G02B 6/02357* (2013.01); *G02B 6/02366* (2013.01); *G02B 6/02371* (2013.01); *G01C 19/727* (2013.01)

(58) Field of Classification Search
CPC ..................................................... G01C 19/727
See application file for complete search history.

(56) References Cited

U.S. PATENT DOCUMENTS

| 6,539,155 B1 | 3/2003 | Broeng et al. |
| 7,180,598 B2 | 2/2007 | Willig et al. |

(Continued)

FOREIGN PATENT DOCUMENTS

| CN | 102519447 A | 6/2012 |
| CN | 105164495 A | 12/2015 |

(Continued)

OTHER PUBLICATIONS

J. K. Lyngsø, C. Jakobsen, H. R. Simonsen, J. Broeng, "Truly single-mode polarization maintaining hollow core PCF," Proc. SPIE 8421, OFS2012 22nd International Conference on Optical Fiber Sensors, 84210C (Oct. 17, 2012); doi: 10.1117/12.975062. (Year: 2012).*

(Continued)

*Primary Examiner* — Omar R Rojas
(74) *Attorney, Agent, or Firm* — Fogg & Powers LLC (57) ABSTRACT

An interferometric optical fibre sensor comprises optical fibre defining an optical circuit configured to propagate a first optical wave via an environment in which the optical fibre can be exposed to a stimulus that modifies the first optical wave, and a second optical wave, and to combine the first optical wave and the second optical wave to create an interference signal containing information about the stimulus, wherein optical fibre propagating either or both of the first optical wave and the second optical wave comprises (Continued)

hollow core optical fibre configured to propagate the optical wave or waves by an antiresonant optical guidance effect.

10 Claims, 6 Drawing Sheets

(56) References Cited

U.S. PATENT DOCUMENTS

| | | | |
|---|---|---|---|
| 7,327,460 | B2 | 2/2008 | Sanders et al. |
| 7,372,574 | B2 | 5/2008 | Sanders et al. |
| 7,463,360 | B2 | 12/2008 | Hughes et al. |
| 7,522,284 | B2 | 4/2009 | Sanders et al. |
| 7,619,743 | B2 | 11/2009 | Digonnet et al. |
| 7,697,143 | B2 | 4/2010 | Sanders et al. |
| 7,751,055 | B2 | 7/2010 | Sanders et al. |
| 7,844,152 | B2 | 11/2010 | Sanders |
| 7,911,620 | B2 | 3/2011 | Digonnet et al. |
| 8,098,380 | B2 | 1/2012 | Sanders et al. |
| 8,427,651 | B2 | 4/2013 | Digonnet |
| 9,158,065 | B2 | 10/2015 | Fini |
| 10,451,421 | B2 | 10/2019 | Sanders et al. |
| 2004/0263856 | A1 | 12/2004 | Willig et al. |
| 2005/0232560 | A1 | 10/2005 | Knight et al. |
| 2008/0180681 | A1 | 7/2008 | Digonnet |
| 2010/0128277 | A1 | 5/2010 | Qiu et al. |
| 2011/0134432 | A1 | 6/2011 | Terrel et al. |
| 2011/0141477 | A1 | 6/2011 | Sanders et al. |
| 2012/0062902 | A1 | 3/2012 | Digonnet |
| 2012/0307251 | A1 | 12/2012 | Sanders et al. |
| 2013/0070252 | A1 | 3/2013 | Feth |
| 2014/0003778 | A1 | 1/2014 | Lyngsøe et al. |
| 2015/0260520 | A1 | 9/2015 | Qiu et al. |
| 2015/0369606 | A1 | 12/2015 | Sanders et al. |
| 2016/0252673 | A1 | 9/2016 | Fini et al. |
| 2017/0160467 | A1 | 6/2017 | Poletti et al. |
| 2018/0347986 | A1 | 12/2018 | Kim et al. |

FOREIGN PATENT DOCUMENTS

| | | |
|---|---|---|
| EP | 0434767 A1 | 7/1991 |
| EP | 3249432 A1 | 11/2017 |
| WO | 2006083691 A1 | 8/2006 |
| WO | 2015185761 A1 | 12/2015 |

OTHER PUBLICATIONS

Aref et al., "Modal Interferometer Based on ARROW Fiber for Strain and Temperature Measurement", IEEE Photonics Technology Letters, Nov. 1, 2009, pp. 1636 through 1638, vol. 21, No. 21, IEEE.
Hayes et al., "Antiresonant Hollow Core Fiber with Octave Spanning Bandwidth for Short Haul Data Communications", at least as early as Mar. 14, 2016, pp. 1 through 3.
International Searching Authority, "International Search Report and Written Opinion from PCT Application No. PCT/GB2019/052189", dated Oct. 9, 2019, pp. 1 through 17, Published: WO.
Jimenez et al., "An integrated silicon ARROW Mach-Zehnder interferometer for sensing applications", Optics Communication 132, Dec. 15, 1996, pp. 437 through 441, Elsevier.
Mawazuddin et al., "Lotus Shaped Negative Curvature Hollow Core Fibre with 10.5 dB/km at 1550 nm Wavelength", Optoelectronics Research Centre, May 1, 2017, pp. 1 through 3, University of Southampton.
Poletti, "Nested antiresonant nodeless hollow core fiber", Optics Express, Oct. 6, 2014, pp. 23807 through 23828, OSA.
Rohrer et al., "Polarization Maintaining Behavior of Hollow-Core Fibers", Ultrafast Laser Sources and Optics // Beam Delivery for High Power Ultrafast Lasers, 2018, p. 1, SLT.
Van Newkirk et al., "Anti-Resonant Hollow Core Fiber for Precision Timing Applications", Photonic Fiber and Crystal Devices: Advances in Materials and Innovations in Device Applications XI, 2017, pp. 103820E-1 through 103820E-7, vol. 10382, Proc. of SPIE.
Yao et al., "Mid-infrared photothermal interferometric gas sensing in hollow-core optical fibers", CLEO, 2018, pp. 1 through 2, OSA.
Belardi et al., "Hollow antiresonant fibers with reduced attenuation", Optics Letters, Apr. 1, 2014, pp. 1853-1856, vol. 39, No. 7, Optical Society of America.
European Patent Office, "Communication under Rule 71(3) EPC from EP Application No. 18020576.7", from Foreign Counterpart to U.S. Appl. No. 15/952,971, May 26, 2020, pp. 1 through 58, Published: EP.
European Patent Office, "Extended EP Search Report from EP Application No. 18020576.7 dated May 31, 2019", "From Foreign Counterpart of U.S. Appl. No. 15/952,971", pp. 1-10, Published in EP.
Jiao et al. "Analysis of polarization noise in transmissive single-beam-splitter resonator optic gyro based on hollow-core photonic-crystal fiber", Optics Express; vol. 25, No. 22; Oct. 30, 2017; pp. 27806-27817.
Meng et al., "Low Loss Hollow-Core Antiresonant Fiber With Nested Elliptical Cladding Elements", Photonics Journal EEE, vol. 10, pp. 1-12, Dec. 2016.
Mousavi et al., "First Design of High Birefringence and Polarising Hollow Core Anti-resonant Fibre", 2015 European Conference on Optical Communication (ECOC), Date of Conference: Sep. 27-Oct. 1, 2015, pp. 1-3, Publisher: IEEE.
U.S. Patent and Trademark Office, "Corrected Notice of Allowability", U.S. Appl. No. 15/952,971, filed Jul. 25, 2019, pp. 1 through 10, Published: US.
U.S. Patent and Trademark Office, "Notice of Allowance", U.S. Appl. No. 15/652,971, Jun. 19, 2019, pp. 1-16, Published: US.
China National Intellectual Property Administration, "Notification of the First Office Action from CN Application No. 17266408.4, dated Jun. 23, 2022", from Foreign Counterpart to U.S. Appl. No. 17/266,408, pp. 1 through 23, Published: CN.

* cited by examiner

RESONANT FIBRE OPTIC GYROSCOPES USING HOLLOW CORE OPTICAL FIBRE AND METHODS THEREOF

This application claims priority to International Patent Application No. PCT/GB2019/052189 filed on Aug. 5, 2019, which claims priority to GB Patent Application No. 1812744.9 filed on Aug. 6, 2018.

BACKGROUND OF THE INVENTION

The present invention relates to interferometric optical fibre sensors.

A class of optical sensor based on optical fibres is the optical fibre interferometer, or interferometric optical fibre sensor. In an interferometer, a parameter of interest (measurand), which may be rotation, movement, pressure, temperature or strain, for example, is encoded in a sensing optical signal or wave by transducing the desired measurand into a phase delay or a frequency shift of that wave. The sensing optical wave is combined with a reference optical wave to obtain an interference signal, the intensity of which has some proportionality to the measurand. A magnitude of or change in the measurand can therefore be deduced from the interference signal. An optical fibre interferometer is an interferometer in which one or both of the sensing wave and the reference wave is carried in optical fibre (waveguide). Examples include the fibre Michelson interferometer and the fibre Mach-Zehnder interferometer, in which the sensing wave experiences the measurand (which perturbs the phase and/or the frequency) and the reference wave does so to a lesser extent or not at all. Other examples include fibre loop-based interferometers in which sensing and reference waves propagate in opposite directions through a loop of fibre and therefore experience the measurand in such a way that the phase of frequency disturbance occurs oppositely (differentially) for the two counterpropagating waves. This class of fibre loop-type interferometers include those that exploit the Sagnac effect, such as the interferometric fibre optic gyroscope (IFOG) and the resonant fibre optic gyroscope (RFOG), in which the angular rotation of the fibre loop comprises the measurand, and the fibre itself behaves as both transducer and waveguide.

A common feature of interferometers including fibre-based devices is that the sensed parameter is inferred from the phase or frequency difference detected from the interfered sensing and reference optical waves. Any phase or frequency perturbations that arise in either wave from factors other than the measurand are included in the final interference signal, producing spurious effects that cannot be readily distinguished from the effects of the measurand. In addition to such unwanted phase and frequency imperfections, optical fibre interferometers are also subject to interference effects from optical waves that have not traversed the intended paths of the sensing and reference waves and therefore have an erroneous interferometric phase. For example, small reflections from components such as fibre couplers included in the optical circuit create additional optical waves that can produce spurious interferometric signals, limiting the performance of the interferometer. Similarly, interference of any higher order spatial modes, which will propagate in the optical fibre at a different interferometric delay, can produce so-called multi-path interference, which reduces sensor accuracy and stability.

Optical fibre interferometers are conventionally implemented using solid core single mode silica optical fibre. This is a well-developed fibre type commercially available with beneficial characteristics including low loss and high modal purity, which enable interferometers with reduced errors associated with signal loss and multi-path interference. However, the optical mode guided in the fibre necessarily propagates largely within the fibre's glass core so that an interferometer made from solid core fibre is subject to errors arising via unwanted environmental effects in the glass medium such as the thermo-optic and Faraday effects, as well as nonlinear optical interactions between the optical mode field and the glass in which it propagates, such as the optical Kerr effect.

The use of hollow core photonic bandgap fibre (HCPBF) to carry the sensing optical wave has been suggested for the suppression of errors associated with the thermo-optic effect [1, 2]. HCPBF has a central air-filled hollow core surrounded by a cladding formed from a closely packed array of many capillaries having a periodicity that gives photonic crystal properties to the cladding. The hollow core means that there is a only a small overlap between the propagating optical mode and the glass structure of the cladding, giving reduced tendency for nonlinear interactions compared to solid core fibre. U.S. Pat. No. 7,911,620 [1] describes an IFOG implemented with a HCPBF sensing fibre having a reduced thermal phase sensitivity and a commensurate improvement in performance over temperature. U.S. Pat. No. 7,180,598 [2] similarly describes the use of HCPBF as an IFOG sensing coil and asserts reduced environmental errors due to the low thermal phase constant, and the suppression of noise and instability mechanisms related to stochastic thermal phase errors and the Kerr effect. However, while HCPBF offers some benefits in attenuating thermal and nonlinear optical effects, this fibre type suffers from effects which are undesirable for optical fibre interferometers, including higher order mode coupling and wavelength-dependent attenuation which can introduce additional spurious signals which are not present in solid core fibre sensors. U.S. Pat. No. 7,751,055 [8] describes a further example which uses hollow core fibre in a RFOG incorporating a recirculator device in which a polarisation state of the circulating light beams is maintained.

Accordingly, there is scope for improvement in the design of optical fibre interferometers to achieve enhanced performance.

SUMMARY OF THE INVENTION

Aspects and embodiments are set out in the appended claims.

According to a first aspect of certain embodiments described herein, there is provided an interferometric optical fibre sensor comprising optical fibre defining an optical circuit configured to propagate a first optical wave via an environment in which the optical fibre can be exposed to a stimulus that modifies the first optical wave, and a second optical wave, and to combine the first optical wave and the second optical wave to create an interference signal containing information about the stimulus, wherein optical fibre propagating either or both of the first optical wave and the second optical wave comprises hollow core optical fibre configured to propagate the optical wave or the optical waves by an antiresonant optical guidance effect, the hollow core optical fibre having a cladding comprising a plurality of glass cladding capillaries arranged in a ring around the hollow core, each cladding capillary being bonded to an inner surface of a tubular outer jacket; and further comprising an optical source operable to generate light at a wavelength which the hollow core optical fibre is configured to guide by the antiresonant optical guidance effect, and deliver the light to the optical circuit as linearly polarized light to provide the optical wave and the second optical wave.

According to a second aspect of certain embodiments described herein, there is provided a method of sensing a stimulus comprising: propagating linearly polarized light in optical fibre as a first optical wave at a wavelength and a second optical wave at the wavelength; exposing the optical fibre propagating the first optical wave to a stimulus that modifies the first optical wave; combining the first optical wave and the second optical wave such that the waves interfere; and detecting the combined first and second optical waves to obtain an interference signal containing information about the stimulus; wherein either or both of the first optical wave and the second optical wave is propagated in hollow core optical fibre configured to propagate light at the wavelength by an antiresonant optical guidance effect, the hollow core optical fibre having a cladding comprising a plurality of glass cladding capillaries arranged in a ring around the hollow core, each cladding capillary being bonded to an inner surface of a tubular outer jacket.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, apparatus and methods may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure proposes the use of hollow core antiresonant optical fibres (ARFs) in optical fibre interferometers. The inventors have been found that, contrary to generally accepted knowledge in the technical field of optical fibres regarding polarisation maintenance, ARFs show an excellent performance as regards maintaining the polarisation state of a linearly polarised propagating optical field. This makes them highly suitable for use in optical fibre interferometers, which is a surprising result since standard ARF designs lack features generally understood to be necessary for good polarisation maintaining performance. These fibres also have a range of other properties that are useful for efficient and accurate interferometric operation.

The management of polarisation states of propagating optical waves is an important design parameter which should be considered for interferometers, and which can be a key factor determining overall sensor accuracy and stability. Indeed, interferometric sensors are often categorized by their polarisation management architecture due to its prominent role in sensor performance and behaviour. In order to maximise the desired interference signal, the sensing and reference optical waves arriving at the interferometer's detector should have the same state of polarisation. To achieve this, the polarisation state of light propagating in the sensor should be carefully managed throughout the optical circuit that makes up the sensor. For lower accuracy fibre interferometers, a common design strategy is to employ an unpolarised light source to generate the sensing and reference waves, and an optical circuit for the wave propagation which is free from polarisation-dependent components and fibres. The interference signal in this instance represents the sum of the interfered intensity terms arising from each individual polarisation state. However, to ensure stable interferometric contrast at the detector, this approach effectively imposes requirements on the polarisation dependent losses and birefringence of each element in the optical circuit, parameters which can be difficult to control for standard optical fibres and components.

Therefore, a preferred approach for higher accuracy interferometers is to employ a polarised light source and/or polarising elements along the optical path, thereby ensuring maximum interferometric contrast of at least one polarisation state at the system detector. Such sensors require polarisation maintaining (PM) optical fibre to separate polarisation modes and preserve their alignment with respect to polarising and/or birefringent components distributed throughout the optical circuit. This separation of polarisation modes within the fibre produces an additional source of sensor error, however, as small imperfections in the PM fibre can cause unwanted coupling between polarisation modes which is distributed along the length of the optical circuit. The magnitude of this coupling, and consequently the magnitude of many polarisation state-dependent errors in the sensor, is described by the PM fibre's "h-parameter" (holding parameter). The h-parameter is a quantity defined to be the fraction of optical power which is coupled between polarisation modes per meter of propagation length through the fibre. A lower h-parameter indicates a lesser amount of coupling and corresponding better polarisation maintenance, which can give a better interferometer performance.

Solid core optical fibres conventionally used for optical fibre interferometers can be formatted as PM fibres. Birefringence (a difference, $\Delta n$, in the effective refractive index n experienced by two orthogonal polarisation modes) in the fibre's solid glass core splits the fundamental guided optical mode into its orthogonal polarisation components which then propagate at different speeds. To create birefringence in the fibre core, these fibres use either stress-members in the fibre cladding to produce birefringence via the stress-optic effect, or an asymmetric fibre core geometry which produces a direct spatial (form) birefringence. An asymmetry is introduced between two orthogonal axes in the fibre's transverse cross-sectional structure (such as elliptical cladding in place of a circular cladding) to purposely create an intrinsic birefringence that is larger in magnitude than any other birefringence that might be introduced by perturbations along the fibre, and ensures that light launched into the fibre on one polarisation axis remains on that axis with minimal leakage into the orthogonal axis. These features are mostly effective at separating the polarisation modes, and high-performance PM solid core fibres are typically specified with h-parameter values less than $1\times10^{-5}$ m$^{-1}$ (10 ppm/m). However, the introduction of structural features into the fibre cross-section to produce the birefringence can also produce an undesirable increase in attenuation of the propagating optical power, and a worsening of the modal properties of the fibre, and can further restrict the fibre's other design parameters. Moreover, in solid core fibre a relatively large magnitude birefringence is required to overcome random coupling between polarisation modes, which occurs due to random geometric or thermal perturbations along the fibre length. Birefringence magnitudes for solid core PM fibres are typically in the range of $\Delta n \approx 1\times10^{-4}$ to $1\times10^{-3}$. Birefringence is often expressed inversely as the "beat length", which is defined as the length of fibre $L_B$, over which two linear polarisation modes are delayed relative to each other by a single wavelength, $\lambda$, such that $L_B = \lambda/\Delta n$. Solid core PM fibres carrying light at a wavelength of 1550 nm can require beat lengths as low as 2 to 4 mm in order to achieve values of h-parameter lower than $1\times10^{-5}$ m$^{-1}$, which is the limit required for many sensor applications. Accordingly, solid core PM fibre for optical fibre interferometers can be difficult to fabricate. This is in addition to other drawbacks such as nonlinear interactions and backscatter arising in the solid glass core of these fibres.

An alternative to solid core optical fibre is hollow core optical fibre, in which the light-guiding core comprises a central void (commonly filled with air, but also alternatively with other gas or a vacuum), surrounded by a cladding comprising a structured arrangement of longitudinal capillaries extending along the fibre length. The absence of a glass core reduces the proportion of a guided optical wave which propagates in glass compared to a solid core fibre. The optical wave therefore experiences reduced nonlinear effects, suggesting that hollow core fibre may be useful for avoiding spurious interference effects occurring in solid core fibre interferometric sensors.

Hollow core fibres can be categorised according to their mechanism of optical guidance, where two types are hollow core photonic bandgap fibre (HCPBF, alternatively hollow core photonic crystal fibres, HCPCF) and antiresonant hollow core fibre (AR-HCF or ARF).

Figure 1:
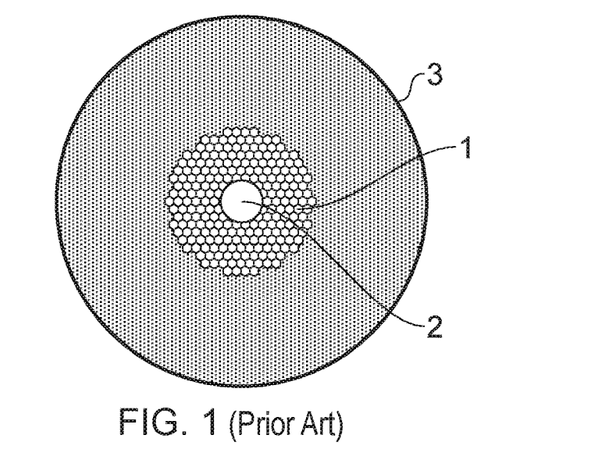
FIG. 1 shows a cross-sectional view of an example of a hollow core photonic bandgap optical fibre.

FIG. 1 shows a cross-sectional view of an example HCPBF. In this fibre type, the cladding 1 comprises a regular closely packed array of many small glass capillaries, from which a central group is excluded to define a substantially circular hollow core 2. The periodicity of the cladding capillary structure provides a periodically structured refractive index and hence a photonic bandgap effect that confines the propagating optical wave towards the core. These fibres can be described in terms of the number of cladding capillaries or "cells" which are excluded to make the core 2. In the FIG. 1 example, the central nineteen cells from the array are absent in the core region, making this a 19-cell core HCPBF. The cladding 1 is formed from six rings of cells surrounding the core 2, plus some cells in a seventh ring to improve the circularity of the outer surface of the cladding. A protective outer jacket 3 surrounds the cladding 1.

Hollow core photonic bandgap fibre has been proposed for use in IFOG interferometers [1, 2], but performance of such devices may be unsatisfactory owing to poor polarisation-maintaining properties of this fibre type. As noted above, polarisation maintenance is a key factor for good optical fibre interferometer performance. However, in HCPBF, the polarisation state can vary significantly as it propagates along the fibre due to irregularities at the air-glass interface and the presence of surface modes which can act as intermediate states for polarisation mode coupling. Hence, the polarisation state of a propagating wave is not well-maintained, and the interferometric contrast at the detector of an interferometer is weakened. To preserve the polarisation state in an HCPBF, geometric features can be introduced into the cladding of the fibre in order to create a structural asymmetry. For example, glass nodes of fractionally higher mass than the core surround can be inserted along a preferential axis to give an asymmetry designed to produce birefringence, thus separating the polarisation modes and creating a PM HCPBF [3]. However, such features invariably exacerbate attenuation and modal impurity, and thus the sensor performance benefit of air-guidance in HCPBFs can be outweighed by the deleterious effects of modal interference and reduced bandwidth which accompany polarisation guiding geometric features. As with solid core fibre, a relatively large magnitude birefringence is required to effectively segregate the polarisation modes in HCPBF and prevent polarisation mode coupling. Furthermore, the design features required to produce a sufficiently large birefringence in a PM HCPBF can heavily attenuate one of the two linear polarisation modes, which is a disadvantage as regards use of this type of fibre in interferometers which rely on detection of both polarisation modes.

In contrast to HCPBF, antiresonant hollow core fibres guide light by an antiresonant optical guidance effect. The cladding of ARFs has a simpler configuration, comprising a much lower number of larger glass capillaries or tubes than a HCPBF to give a structure lacking any high degree of periodicity so that photonic bandgap effects are not significant. Rather, antiresonance is provided for propagating wavelengths which are not resonant with a wall thickness of the cladding capillaries, in other words, for wavelengths in an antiresonance window which is defined by the cladding capillary wall thickness. The cladding capillaries surround a central void or cavity which provides the hollow core of the fibre, and which is able to support air-guided optical modes. The cladding can also support cladding modes able to propagate primarily inside the capillaries, in the glass of the capillary walls or in the spaces or interstices between the cladding capillaries and the fibre's outer jacket layer. The antiresonance provided by a capillary wall thickness which is in antiresonance with the wavelength of the propagating light acts to inhibit coupling between the fundamental core mode and any cladding modes, so that light is confined to the core and can propagate at very low loss.

Figure 2A:
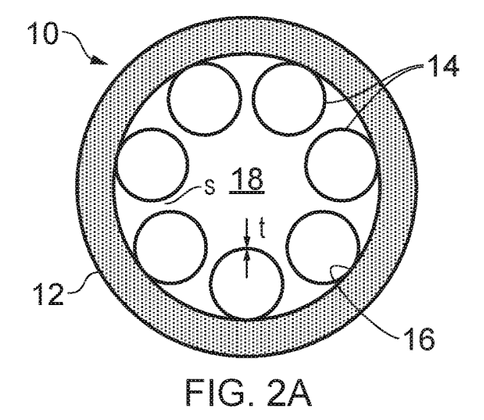
FIGS. 2A, 2B, 2C and 2D shows cross-sectional views of examples of antiresonant hollow core optical fibres suitable for use in embodiments of the disclosure.

FIG. 2A shows a transverse cross-sectional view of an example simple antiresonant hollow core fibre. The fibre 10 has an outer tubular jacket 12. A plurality of tubular cladding capillaries 14, in this example seven capillaries of the same cross-sectional size and shape, are arranged inside the jacket 12 in a ring, so that the longitudinal axes of each cladding capillary 14 and of the jacket 12 are substantially parallel. The cladding capillaries 14 define elongate holes, cells, lumen or cavities which extend continuously along the length of the optical fibre. The cladding capillaries 14 are each in contact with (bonded to) the inner surface of the jacket 12 at a location 16, such that the cladding capillaries 14 are evenly spaced around the inner circumference of the jacket 12, and are also spaced apart from each other (there is no contact between neighbouring capillaries). In some designs of ARF, the cladding tubes 14 may be positioned in contact with each other (in other words, not spaced apart as in FIG. 2A), but spacing to eliminate this contact improves the fibre's optical performance. The spacing s removes optical nodes that arise at the contact points between adjacent tubes and which tend to cause undesirable resonances that result in high losses. Accordingly, fibres with spaced-apart cladding capillaries may be referred to as "nodeless" antiresonant hollow core fibres.

The arrangement of the cladding capillaries 14 in a ring around the inside of the jacket 12 creates a central space, cavity or void within the fibre 10, also with its longitudinal axis parallel to those of the jacket and capillaries, which is the fibre's hollow core 18, also extending continuously along the fibre's length. The core 18 is bounded by the inwardly facing parts of the outer surfaces of the cladding capillaries. This is the core boundary, and the material (glass or polymer, for example) of the capillary walls that make up this boundary provides the required antiresonance optical guidance effect or mechanism.

The capillary walls at the core boundary have a thickness t. The core boundary might be thought of as a glass (or other material) membrane surrounding the core 18 (which may or may not be continuous according to whether or not adjacent capillaries 14 are in contact), where t is the membrane thickness. In this example, all capillaries have substantially the same thickness, for which an average might be taken to determine the value of t. For a wavelength A of light which is guided in the fibre core 18 (guided optical mode or optical wave) by the antiresonant optical guidance effect, the thickness t falls in the range $$\frac{m\lambda}{2\sqrt{n^2-1}} \leq t \leq \frac{(m+1)\lambda}{2\sqrt{n^2-1}} \qquad \text{Equation 1}$$

where n is the refractive index of the glass wall or membrane, and m=0, 1, 2 . . . . Accordingly, the wavelength λ for antiresonant optical guiding lies within the $(m+1)^{th}$ antiresonance window. This antiresonance at the core boundary confines the propagating core mode into the hollow central core region. In other words, the thickness t and refractive index n can be selected to accommodate a desired operating wavelength λ that sits between high loss resonant wavelengths of the fibre and is hence in antiresonance, in that the air mode for propagation of that wavelength in the hollow core is not phase matched to glass modes for propagation of the wavelength in the capillary walls. For the resonant wavelengths, this phase matching exists and loss is high. For the operating wavelength, propagation in the glass of the capillaries is in antiresonance and the electromagnetic field on at least one of the two glass-air interfaces at the inner and outer surfaces of the capillaries is minimised; hence the antiresonant wavelength experience low loss and is able to be successfully waveguided along the hollow core. Further information about the antiresonant waveguiding mechanism in ARFs and its differences from the photonic bandgap waveguiding mechanism in HCPBFs can be found in [4].

Usefully, the thickness t, if an average value for the membrane thickness, has a standard deviation of less than 50%.

Note that the effective cross-sectional area of the core 18 is larger than the cross-sectional areas of the individual cladding capillaries. For typical operating wavelengths and fibre dimensions, the core 18 may have an effective diameter (defined as the square root of the effective cross-sectional area of the core) which is in the range of 10 to 50 times the guided wavelength.

The ring of cladding capillaries create a core boundary which has a shape comprising a series of adjacent inwardly curving surfaces (that is, convex from the point of view of the core). This contrasts with the usual outward curvature of the core-cladding interface in a solid-core fibre, and the substantially circular core boundary of a HCPBF (see FIG. 1). Accordingly, antiresonant hollow core fibres can be described as negative curvature fibres. Mathematically, this can be defined as the surface normal vector of the core boundary being oppositely directed to a radial unit vector (vector along a radius of the transverse cross-section of the fibre). The negative curvature (convex shape) of the core boundary also inhibits coupling between the fundamental core mode and any cladding modes. A negative curvature antiresonant hollow core fibre has a core boundary formed by a convex membrane or wall (typically of glass) which a thickness which is matched to be in antiresonance with the guided optical wavelength.

FIG. 2A shows merely one example of an ARF. Many other possible ARF structures may be used to implement interferometric sensors as described herein.

Figure 2B:
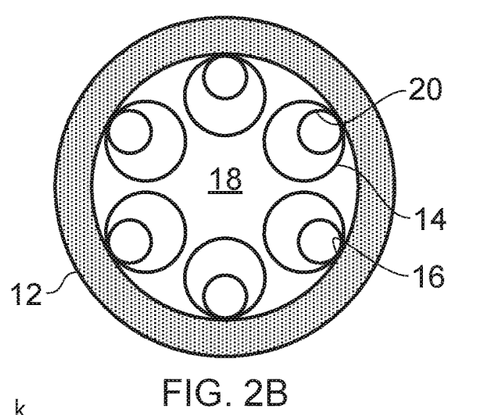

FIG. 2B shows a transverse cross-sectional view of a second example ARF. The ARF comprises six cladding capillaries 14 evenly spaced apart around the inner surface of the jacket 12 and surrounding the core 18. Each cladding capillary 14 has a secondary, smaller capillary 20 nested inside it, bonded to the inner surface of the cladding capillary, in this example at the same azimuthal location 16 as the point of bonding between the primary capillary 14 and the jacket 12. These additional smaller capillaries 20 can reduce the optical loss. Additional still smaller tertiary capillaries may be nested inside the secondary capillaries. ARF designs of this type, with secondary and optionally further smaller capillaries, may be referred to as "nested antiresonant nodeless fibres", or NANFs.

Many other configurations are possible. The capillaries need not be of circular cross-section. A non-circular capillary shape may be achieved in the finished fibre by fabricating the fibre from non-circular tubular components, or from surface tension between touching components pulling those components into different shapes during the fibre fabrication process. An example of this can be seen in FIG. 3, which includes an image of a so-called lotus-shaped fibre, in which a ring of initially circular capillary tubes alternating with and contacting smaller circular tubes are all distorted into petal-like shapes during drawing of the fibre. More generally, the capillaries may or may not be all of the same size and/or shape. They may alternate around the ring between smaller and larger sizes, for example. Smaller capillaries may be provided against the jacket surface or at a more inward position to aid in spacing the primary capillaries without contributing significantly to the core boundary. Capillaries may be arranged within a second ring, so that an inner ring primarily provides the core boundary and an outer ring is adjacent the inner surface of the jacket. The number of capillaries making up the core boundary may be, for example, four, five, six, seven, eight, nine or ten, although other numbers are not excluded.

Figure 2C:
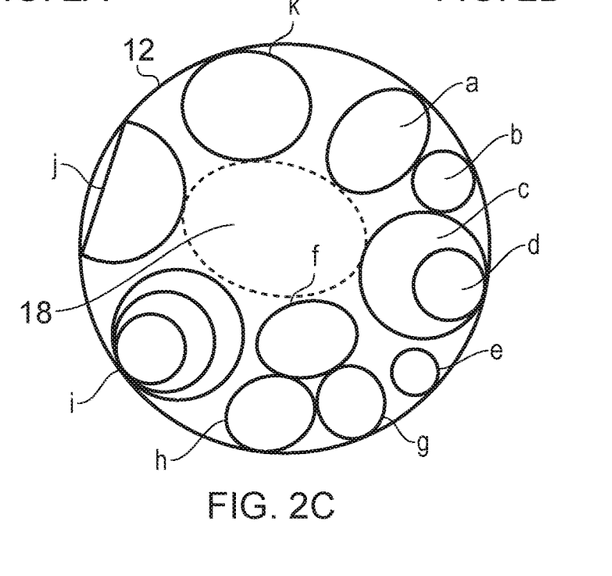

FIG. 2C shows a composite view of several example ARF structures, where a variety of cladding capillaries are shown within a single fibre merely for the purpose of illustration. In reality the ARF will comprise the same structure or pattern of a capillary or group of capillaries repeated a number of times around the core to create the core boundary. The core 18 becomes eccentric and off-centre in this example owing to the variety of capillary sizes and shapes; in reality it will be centred and more regularly shaped. An example capillary a has an elliptical shape, bonded to the jacket 12 so that its long axis is aligned along the fibre's radius. An example capillary b is small, and in contact with the larger capillary a and the jacket inner surface, spacing it apart from an adjacent example capillary c, which has a single secondary capillary d nested within it. An example capillary e is also small, bonded to the jacket 12 and not in contact with adjacent capillaries. An example capillary f is elliptical, having its short axis along the radial direction, and arranged inwardly to define the core boundary while a circular capillary g is placed between the capillary f and the jacket surface, in contact with both. The capillary g forms an outer ring with an adjacent capillary h, also in contact with the jacket surface and the inward capillary f. An example nested capillary group i comprises three capillaries nested one inside the other and all bonded at a common contact point, at which the outer, primary capillary is bonded to the jacket. The primary capillary is spaced apart from adjacent capillaries to avoid nodes. An example capillary j has a semi-circular shape, with its curved side facing inwardly to provide a convex surface for the negative curvature core boundary. A final example capillary k is a simple curved shaped bonded to the inner surface of the jacket 12 and spaced from its neighbours to avoid nodes.

In a real ARF, where the configuration of individual capillaries or capillary groups is repeated a number of times around the fibre circumference to surround the core and define the core boundary, the resulting structure typically has a high degree of rotational symmetry. In other words, the transverse cross-sectional structure maps onto itself multiple times within a full rotation of 360° (such as seven times at 51.4° intervals for the FIG. 2A example and six times at 60° intervals for the FIG. 2B example). In particular, it maps at an angle less than 180°. In other words, the structure is not one in which there is an asymmetry between two orthogonal axes in the transverse plane, to give rotational symmetry for a 180° rotation only. Such an asymmetric structure is typically used in solid core fibre, and has been used in HCPBF [3], to achieve polarisation maintaining properties by providing a birefringence between the two axes as described above. However, since it has been ascertained (described in more detail below) that ARF has a surprising inherent polarisation maintaining ability, there is no requirement for any such structural asymmetry in ARF (or other technique for providing birefringence) for use in interferometric optical fibre sensors. An ARF with a structure having rotational symmetry at one or more angles less than 180° (or no rotational symmetry) can be used, according to the present disclosure.

However, an ARF with one or more structural features that do give some asymmetry between two orthogonal axes are not excluded, and may be considered useful in some cases, for example to supplement the basic polarisation maintaining capability.

Figure 2D:
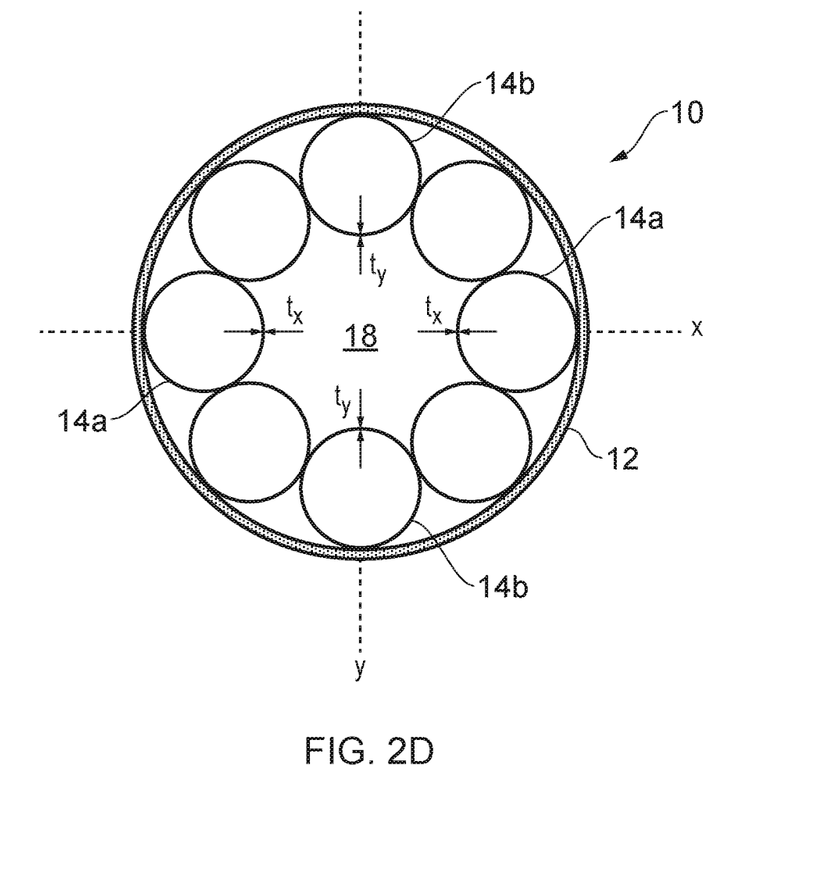

FIG. 2D shows a transverse cross-sectional view of a ARF configured with such an asymmetry. In this example, the structural property that gives a rotational symmetry at substantially 180° but not at smaller angles is the wall thickness of the capillaries. In other words, the fibre has a feature which differs along two orthogonal transverse axes where that feature is a wall thickness of the cladding capillaries, so that cladding capillaries with a first wall thickness are positioned on a first transverse axis and cladding capillaries with a second wall thickness different from the first wall thickness are positioned on a second transverse axis orthogonal to the first transverse axis. As illustrated, the example ARF comprises eight cladding capillaries 14, evenly spaced in a ring around the inner circumference of an outer jacket 12. The cladding capillaries are touching or near-touching their immediate neighbours, but, as explained above, an ARF may comprises cladding capillaries which are in contact or which are spaced apart. Two cladding capillaries 14a are aligned with a horizontal transverse axis x passing through the centre of the core 18. These capillaries 14a have a capillary wall or membrane thickness $t_x$. Two other cladding capillaries 14b are aligned with a vertical transverse axis y, orthogonal to the x axis. These capillaries have a wall or membrane thickness $t_y$. The thickness $t_x$ is different from the thickness $t_y$. Using equation 1 above for each value of t, one can determine two antiresonant wavelengths (for each value of m). For use of the ARF in an interferometric sensor, one can use for the sensing wave and the reference wave a wavelength that lies between the two antiresonant wavelengths defined by $t_x$ and $t_y$. Correspondingly, an average thickness calculated from $t_x$ and $t_y$, $(t_x+t_y)/2$, could be used in equation 1 to determine a value for an antiresonant wavelength.

In this example, the capillaries 14a, 14b along the orthogonal axes are the same apart from their wall thickness, in that they have the same size and shape, and are not nested. In other examples, the capillaries along the orthogonal axes might have other different features. The four capillaries lying between the four capillaries along the orthogonal axes are also the same size and shape in this example, and could have a wall thickness of $t_x$, or of $t_y$, or of some other thickness.

In some cases, an ARF having rotational symmetry at 180° can also be described as having mirror symmetry. This is true for the FIG. 2D ARF, for example, in which there is mirror symmetry along the x-axis and the y-axis (assuming the four "off-axis" capillaries are all the same). In other cases, an ARF can have structural features to supplement the polarisation maintaining capability that give mirror symmetry to the cross-sectional structure of the fibre but do not have a 180° rotational symmetry. For example, referring to FIG. 2D, an ARF might have a pair of thicker cladding capillaries oppositely positioned along the x-axis to give some birefringence, and also a feature or features located on one side only of the x-axis, without a matching paired feature on the other side. Such a feature might be at the 0° position (at the top of the y-axis) if the x-axis defines the 90° and 270° positions, for instance. Such a feature might be for assistance in splicing the fibre or positional registration or alignment of a loop, for example. A feature or features of this kind might also be included in an ARF without any diametrically opposed features for inducing birefringence; the presence of a single such feature could give an ARF with no rotational symmetry. Depending on the number and similarity of the capillaries, there may or may not be mirror symmetry in such a structure.

Accordingly, the present disclosure is applicable to ARFs of cross-sectional structure with rotational symmetry at angles less than 180°, and also to ARFs with structural features that limit the rotational symmetry to substantially 180° only, or that give mirror symmetry, or both, and also to ARFs with no rotational symmetry.

Referring back to the example HCPBF shown in FIG. 1, observe that the cross-sectional structure of a conventional HCPBF without polarisation maintaining features has roughly circular symmetry. In combination with the small overlap between the propagating optical field guided in the hollow core and the glass of the cladding, this offers only poor preservation of polarisation states. In HCPBFs, the fraction of the optical mode overlapping with the material of the cladding is between about 0.1% to 0.3%.

In antiresonant hollow core fibres, the overlapping fraction is even smaller. Only about 10 to 50 ppm (0.001% to 0.005%) of the optical mode propagates in the glass of the cladding. The cross-sectional structure of ARF has a high degree of rotational symmetry and lack of orthogonal asymmetries, as can be seen from the examples in FIGS. 2A, 2B and 2C. Accordingly, one would expect that ARFs also would offer very poor maintenance of polarisation states, potentially substantially worse than HCPBF.

However, the inventors have found that this is not the case. Surprisingly, ARFs, even without any special geometric structural asymmetry, can demonstrate excellent polarisation-maintaining performance, superior even to that provided by solid core PM fibre. This is because, in ARFs, the lack of stress-optic effects, along with the ultra-low overlap between the fundamental air-guided mode and the surrounding glass microstructure (cladding) mentioned above, provides a structure that is intrinsically free of the polarisation coupling mechanisms that affect solid core fibre and HCPBF. Hence the very features of ARFs that suggest poor polarisation maintenance actually provide excellent polarisation maintenance, even where minimal or no inherent birefringence is present.

Accordingly, it is proposed in the present disclosure that ARF be utilised in optical fibre interferometric sensors, to guide one or both of the sensing wave and the reference wave.

Figure 3:
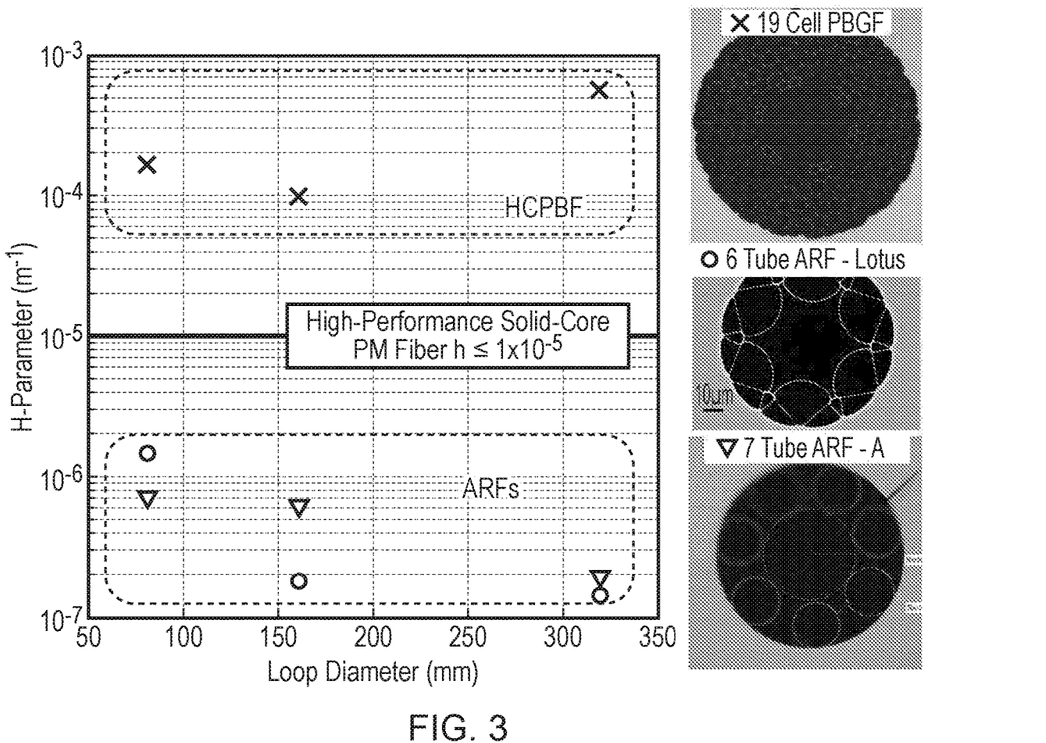
FIG. 3 shows a graph of h-parameter variation with fibre loop diameter for two antiresonant hollow core optical fibres compared with a hollow core photonic bandgap optical fibre and solid core polarisation-maintaining optical fibre, plus cross-sectional images of the three hollow core fibres.

FIG. 3 shows a graph plotting values of the h-parameter for several different optical fibre types, to compare the polarisation-maintaining ability of two ARFs with other fibres. Recall that the h-parameter is the fraction of optical power which is coupled between polarisation modes per metre of fibre, so that a lower value of the h-parameter indicates a better ability to preserve polarisation states. FIG. 3 plots the h-parameter measured from optical fibre coiled into a loop, such as would be done in a fibre gyroscope interferometer, for a range of loop diameters. Also shown in FIG. 3, on the right, are images of the cross-sectional structures of the various fibres. Two ARFs are included: a 7 tube ARF [5], the data from which are plotted as triangles, and a 6 tube lotus-shaped AR [6], the data from which are plotted as circles. As can be appreciated from these images, no attempt was made when fabricating these fibres to introduce any preferential axis to the fibre structure, nor to create a large birefringence. The upper image shows a 19-cell HCPBF, also with no polarisation-maintaining features, the measurements from which are plotted as crosses. In all cases, the data is averaged over a temperature range of 25° C. to 60° C., and measured for a propagating wavelength of 1550 nm. Both ARFs show similar low h-parameters, in the range of about $1 \times 10^{-6}$ m$^{-1}$ to as little as about $1 \times 10^{-7}$ m$^{-1}$. In contrast, the HCPBF shows significantly larger h-parameter values, in the range of about $1 \times 10^{-3}$ m$^{-1}$ to $1 \times 10^{-4}$ m$^{-1}$. For comparison, the graph includes a solid line indicating a typical h-parameter value of $1 \times 10^{-5}$ m$^{-1}$ for high-performance solid core PM fibre. Hence, the ARFs have as much as a one hundred times improvement over solid core PM fibre, even though no polarisation-maintaining features are incorporated. On the other hand, the non-PM HCPBF shows significantly greater h-parameter values than the solid core PM fibre, and, at larger loop diameters, almost four orders of magnitude greater than the ARF fibres. Note, in particular, that the data shows consistently ultra-low polarisation coupling (small h-parameter) in ARFs over a variety of loop diameters, from small loops of about 80 mm diameter to large loops of about 320 mm. This is highly relevant for sensors in which the fibre is deployed in a loop, such as the IFOG and RFOG sensors, in which a long length of fibre is wound into a sensing coil, often in a very tight bend diameter (small loop diameter).

In interferometric sensors for detecting measurands other than temperature, it is beneficial that a fibre shows stable operation across a range of temperatures so that fluctuations in the environmental temperature do not impact on the detected interference signal. AFR has been found to have good properties in this regard.

Figure 4:
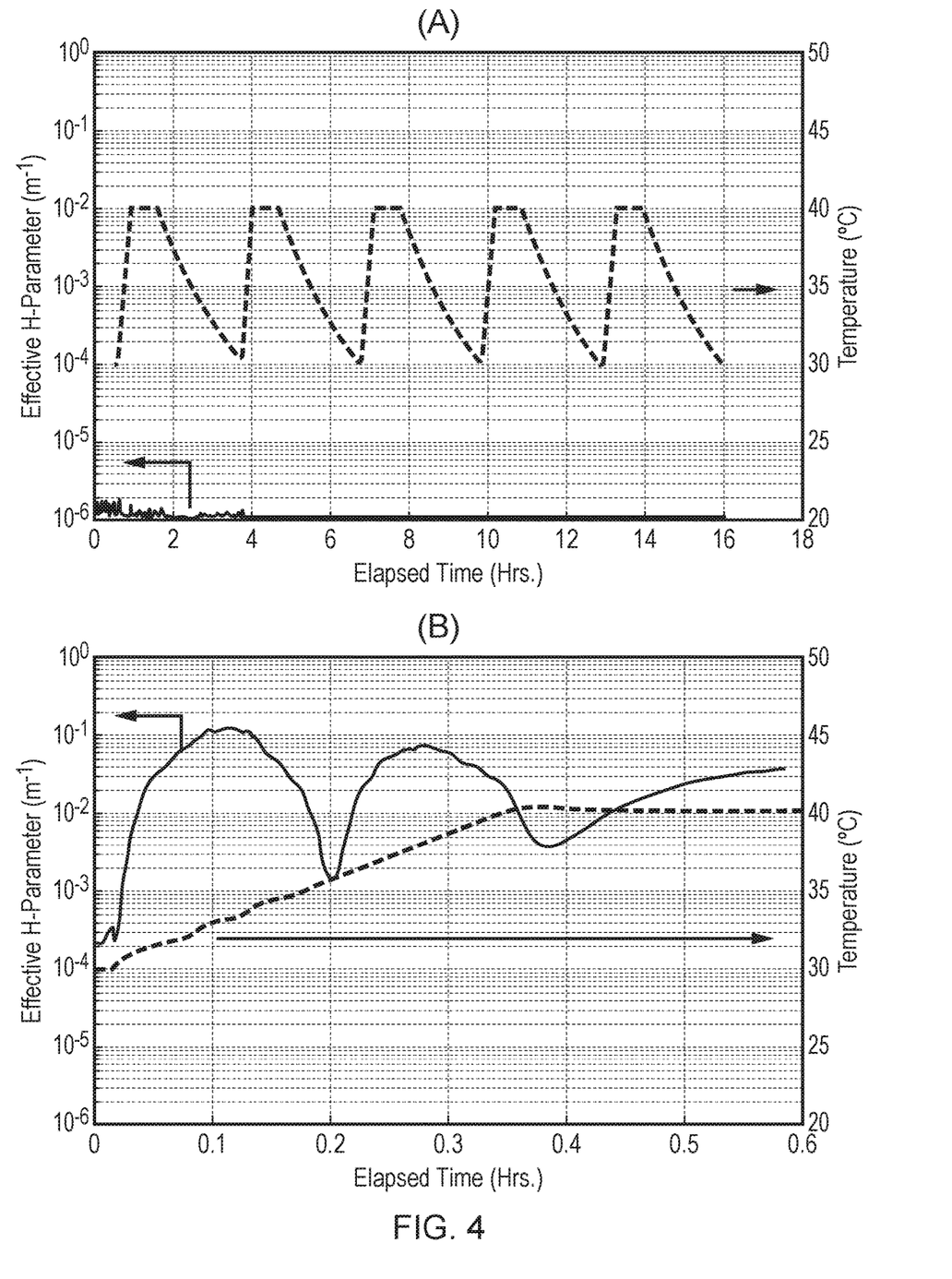
FIGS. 4A and 4B show graphs of the variation of effective h-parameter over time during temperature changes for an antiresonant hollow core optical fibre and a hollow core photonic bandgap fibre respectively.

FIG. 4 shows graphs of the variation of effective h-parameter (left vertical axis) over time (horizontal axis) of fibres exposed to varying temperatures. FIG. 4(A) shows the h-parameter at a wavelength of 1550 nm for the 6-tube lotus ARF of FIG. 3 over a time period of 16 hours while subject to repeated thermal cycles spanning 30° C. to 40° C. The h-parameter remains almost constant at about $1 \times 10^{-6}$ m$^{-1}$, indicating that the polarisation-maintaining performance of the ARF is almost entirely insensitive to temperature. FIG. 4(B) shows the h-parameter at a wavelength of 1550 nm for the 19-cell HCPBF of FIG. 4 over a time period of 0.6 hours while subjected to a temperature increase over the same range of 30° C. to 40° C. The temperature change produces marked changes in the polarisation state of the HCPBF, causing the h-parameter to fluctuate significantly over almost three orders of magnitude ($1 \times 10^{-1}$ m$^{-1}$ to $1 \times 10^{-4}$ m$^{-1}$). Hence, the h-parameter stability with temperature is considerably better for the ARF than the HCPBF.

The data in FIGS. 3 and 4(A) indicate that values of h-parameter less than $1 \times 10^{-5}$ m$^{-1}$ are readily attainable in ARF. For example, the h-parameter may be in the range of $1 \times 10^{-6}$ m$^{-1}$ to $1 \times 10^{-5}$ m$^{-1}$, or in the range of $1 \times 10^{-7}$ m$^{-1}$ to $1 \times 10^{-5}$ m$^{-1}$. In some examples, values significantly less than $1 \times 10^{-5}$ m$^{-1}$ are available, including less than $1 \times 10^{-6}$ m$^{-1}$, or in the range of $1 \times 10^{-7}$ m$^{-1}$ to $1 \times 10^{-6}$ m$^{-1}$. It is expected that low values, including $1 \times 10^{-7}$ m$^{-1}$ and below, and $1 \times 10^{-8}$ m$^{-1}$ and below, are readily achievable in ARF, and values in these ranges are also covered herein.

As discussed above, a large magnitude of birefringence (short beat length), provided for example by a structural asymmetry for two orthogonal axes, is required to overcome the perturbations that cause polarisation coupling in solid core fibres and HCPBFs, in order to achieve polarisation-maintaining operation. In contrast, the inventors have found that this is not required for ARF. As well as the extremely low h-parameter described with reference to FIG. 3, the ARFs were found to have an extremely long beat length, of the order of meters, which is many orders of magnitude longer than that of a typical PM solid core fibre. A long beat length corresponds to a low birefringence.

Figure 5:
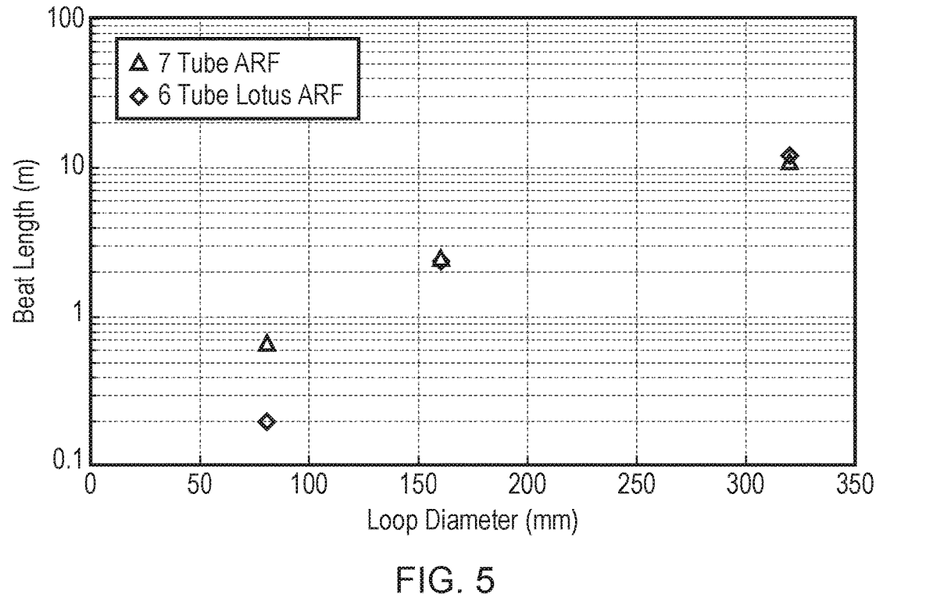
FIG. 5 shows a graph of beat length variation with fibre loop diameter for two antiresonant hollow core optical fibres.

FIG. 5 shows a plot of measured beat length (vertical axis) for a selection of fibre loop diameters (between 80 mm and 320 mm; horizontal axis) formed in the two ARFs from FIG. 3 (triangles show the data for the 7 tube ARF and diamonds show the data for the 6 tube lotus ARF). All measurements are at a wavelength of 1550 nm. Beat lengths in excess of 10 m are found for the ARFs in larger loop diameters (about 320 mm); compare this with typical values of a few millimetres for solid core PM fibre. Even the shorter beat lengths of about 20 cm and 65 cm measured for smaller loops (80 mm diameter) are greatly in excess of beat lengths for solid core PM fibre. Hence the birefringence in the ARF loops is very much smaller in magnitude than typical solid core fibre birefringence values.

Recalling that the beat length is inversely related to the birefringence, we see from FIG. 5 that the magnitude of birefringence increases with tighter (smaller) loop diameters. Compare this with FIG. 3, which shows that the h-parameter does not vary significantly with loop diameter. Hence the larger birefringence produced at a tighter bend radius has minimal impact on the degree of polarisation mode cross-coupling. Some preservation of linear polarisation has been observed in relatively short (2.5 m) lengths of some hollow core fibre types arranged with a bend radius [7]; this is similar to the behaviour of standard solid-core single mode fibre in which bend-induced birefringence can preserve linear polarisation over short distances. In contrast, the use of ARF in optical fibre interferometers proposed herein utilises the ability of ARF to robustly maintain an ultra-pure polarisation state despite minimal or no birefringence.

In addition to the excellent polarisation-maintaining properties demonstrated by ARF, fibres of this type have many other properties that make them useful for optical fibre interferometers. As noted above, the hollow core structure reduces undesirable effects arising from propagation of the optical mode through glass, such as stochastic thermal phase noise, thermal phase instability and the Shupe, Kerr and magneto-optic Faraday effects. These effects are reduced even compared to HCPBF, since the fraction of the optical field propagating in glass can be as much as one hundred times less in ARF. Although both HCPBF and ARF have an air-guiding (hollow, or in some cases gas- or vacuum-filled) core, the complex spatial arrangement of the air-glass interface at the core boundary in HCPBFs gives rise to surface modes, which are glass propagating modes that cause backscattering and can act as an intermediary for higher-order spatial mode coupling. Surface modes arise from the termination of the periodic photonic crystal cladding around the core. Such a termination intrinsically introduces structural features that have different sizes from those in the regular cladding and which, therefore, guide additional, undesirable, surface modes. Such modes do not exist in ARFs. In addition to the absence of surface modes, ARFs can also be designed to have an excellent spatial mode purity, being an ability to guide well and at low loss only the two degenerate fundamental optical modes. This is achieved by effectively mode stripping all other higher order modes through phase matching them to highly lossy air modes guided in the cladding capillaries [5]. Since the structure can be designed such that this phase matching occurs for all the high order modes but not for the fundamental mode, the fibre effectively behaves like a single mode fibre. The absence of surface modes, the excellent modal purity and an absence of other scattering interfaces leading to ultra-low backscattering in ARFs makes these fibres highly beneficial for reducing noise in interferometric applications. ARFs combine the excellent noise suppression of a hollow core fibre with superior polarisation guidance. An interferometric fibre sensor employing ARF in its optical circuit thus exploits the nonlinearity suppression commensurate with an air propagating mode, as well as significantly reduced thermal sensitivity, exceptional modal purity, low backscattering and enhanced polarisation preservation.

The use of ARFs in the optical fibre interferometric sensors is proposed as a means of improving the performance of these sensors. In particular, an ARF in a polarisation-maintaining interferometric sensor (in which the polarisation state of the optical wave or waves is preserved to maximise the interference signal) can provide improved accuracy and stability and reduced noise. The various benefits of hollow core guidance for an ARF in an interferometer, as discussed above, can confer commensurate improvements in accuracy, stability, and sensor noise to the degree that performance is not limited by some other component (for example, signal processing electronics or optical components such as couplers). The superior polarisation properties of an ARF can further improve the interferometric sensor performance by reducing sensitivity to polarisation cross-coupling and associated interferometric errors.

It is proposed that ARF can be deployed as any part, or all parts, of the optical paths in the optical circuit of an interferometric optical fibre sensor. In a fibre interferometer, optical fibre defines the optical paths by carrying the optical waves between the various components, and through a sensing region or environment in which the fibre is exposed to the measurand of interest. The measurand can be considered as a stimulus or environmental condition that acts on the fibre to modify properties of the optical wave within the fibre, in particular its phase or frequency. The optical paths propagate two waves obtained from an optical source, comprising a sensing wave, which experiences the measurand, and a reference wave, which does not experience the measurand, or experiences it differently. The modification of the sensing wave by the measurand alters the phase and/or frequency of the sensing wave compared to that of the reference wave, and the amount of the modification (the amount of phase delay or frequency shift) is proportional to or otherwise related to the magnitude of the measurand. In this way, the measurand is encoded or imprinted into the sensing wave. After the modification, the sensing wave and the reference wave are combined together, and hence interfere, to produce an optical interference signal with an intensity proportional to the size of the modification, and hence related to the magnitude of the measurand. Hence, a non-optical measurand is translated, via a phase or frequency shift, into a simple optical intensity, which is monitored by an optical detector.

A variety of interferometer designs can be implemented using optical fibres, and any of these may benefit from the use of ARF.

Figure 6:
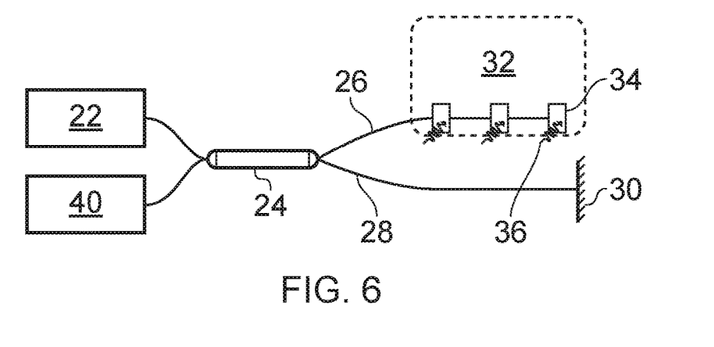
FIG. 6 shows a schematic diagram of an example optical fibre Michelson interferometer according to an embodiment.

FIG. 6 shows a simplified schematic diagram of an example of an optical fibre Michelson interferometer. An optical source 22 (laser) is operable to generate an optical wave which is launched into a portion of optical fibre that comprises (or is coupled to) a first arm of an optical coupler 24. The coupler 24 acts to divide or split the optical wave into two forward propagating portions, one of which is provided to a second fibre arm 26 of the coupler 24 to become a sensing optical wave and the other of which is provided to a third fibre arm 28 of the coupler 24 to become a reference optical wave. The third fibre arm 28 terminates in an optically reflective surface or element 30 (which may for example be simply the cleaved end of the fibre, perhaps with a highly reflective coating at the wavelength of the light output by the laser), so that the reference wave propagates to the reflector 30 where it is returned back along the third fibre arm 28 to the coupler 24. The third fibre arm 28 can be thought of as the reference arm, comprising a reference fibre.

The second fibre arm 26, which can be thought of as the sensing arm comprising a sensing fibre, carries the sensing wave to an environment 32 or region in which the fibre constituting the fibre arm 26 is exposed to a parameter of interest, or measurand, which it is desired that the interferometer can detect or sense. The measurand can be thought of as stimulus 36 that acts on the fibre in such a way that light, in this case the sensing wave, propagating in the fibre is modified. In particular, the phase and/or the frequency (wavelength) of the light is altered or shifted, producing a phase delay and/or a frequency shift in the sensing wave. The size of the delay or the shift depends on the level of the stimulus. The stimulus 36 is present in the environment 32 and can act directly on the fibre, or one or more transducers 34 can be provided to transfer or convert the stimulus 36 into an effect that can modify the sensing wave. The modified sensing wave is reflected back along the second fibre arm 26, either by a reflective effect provided in the transducer(s) or by a reflective element at the fibre end, as for the reference wave fibre arm 28. Examples of parameters that can be sensed with such an arrangement include physical quantities such as temperature, pressure, strain and vibration.

The reflected sensing wave carried in the second fibre arm 26 returns to the coupler 24, where it is combined with the reflected reference wave carried in the third fibre arm 28. The sensing wave has been modified by exposure of the second fibre arm 26 to the stimulus 26, and the reference wave is unmodified because the third fibre arm 28 has not been exposed to the stimulus. Hence, the sensing wave has a phase delay and/or an optical frequency shift relative to the reference wave. The combining (adding) of the two waves hence produces an interference signal with features that depend on the size of the delay and/or the shift, which in turn depends on the level of the stimulus. Hence, the interference signal contains information about the stimulus. The interference signal obtained by combining the sensing wave and the reference wave in the coupler 24 is delivered via a fourth arm of the coupler 24 to an optical detector 40.

Figure 7:
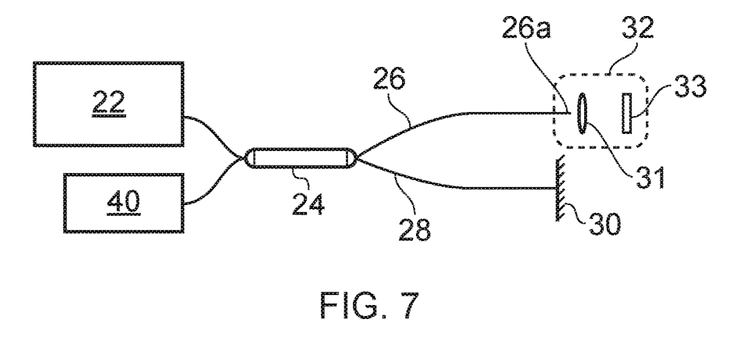
FIG. 7 shows a schematic diagram of an example optical fibre interferometer configured for optical coherence tomography according to an embodiment.

FIG. 7 shows a simplified schematic diagram of an example of a variant of a Michelson fibre interferometer, being a system for optical coherence tomography, which can be used for optical imaging and rangefinding. The optical source 22 may be a swept wavelength laser or a broadband light source, from which an optical wave is launched into a fibre coupled to or comprising a first arm of an optical coupler 24, as before. Also as before, the coupler 24 divides the optical wave into a forward propagating sensing wave in a second fibre arm 26 of the coupler 24, for propagation to an environment 32 of the measurand, and a forward propagating reference wave in a third fibre arm 28 of the coupler which terminates in a reflector 30 for returning the reference wave. As with the previous example, the sensing wave and the reference wave are each reflected and returned to the coupler 24 for combination to provide the interference signal which is detected by a detector or spectrometer 40. This system differs from a regular Michelson fibre interferometer in that the transducer(s) in the sensing arm 26 are replaced with a terminal imaging optical assembly comprising focusing optics 31 which collect light exiting the fibre at the distal end of the sensing arm 26 and focuses it so as to impinge on a sample object of interest 33. At least some of this light is reflected by the sample 33 and returned into the sensing arm 26 for recombination with light from the reference arm 28, as before. Crucially, the reflection in the sensing arm 26 may have an optical phase difference relative to the analogous reflection in the reference arm 28 from the reflector 30. Thus, the interference signal from the recombined signal and reference waves is dependent on any optical phase delay between the point of reflection from the sample 33 and that from the static reflector 30 in the reference arm 28. The measured stimulus, analogous to that described for the FIG. 6 example, is hence the distance between the endface 26a of the sensing fibre 26 and the reflective point in or on the sample 33. By measuring the interference signal in this configuration over a range of optical frequencies (either by employing a frequency modulation/sweep at the light source 22 or by using optical frequency filtering at the detector 40), the interference signal provides information about the magnitude of back-reflection over a range of optical path delays. This can be converted into a map of effective reflection distances and magnitudes, thus providing a tomography measurement of the sample 33. The optical assembly at the sensing arm endface 26a may operate in either a static mechanical arrangement so as to provide reflection measurements over a single sample area, or it may be configured with an armature or other mechanical assembly operable to scan the point of the illumination over the sample (conversely, the sample may be moved while the optical assembly remains fixed), thereby providing a spatially resolved measurement of light reflected by the sample 33.

Figure 8:
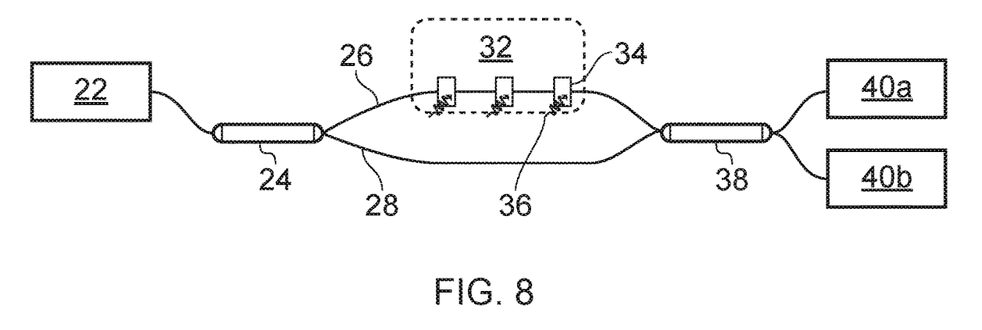
FIG. 8 shows a schematic diagram of an example optical fibre Mach-Zehnder interferometer according to an embodiment.

FIG. 8 shows a simplified schematic diagram of an example of an optical fibre Mach-Zehnder interferometer. This type of interferometer is similar to a Michelson interferometer, except that the interference signal is obtained by interfering the forward propagating optical waves, rather than backward propagating reflections of the reference and sensing waves. Accordingly, as in the FIG. 6 example, the Mach-Zehnder interferometer comprises an optical source 22 that provides light to an optical coupler 24 acting as a splitter that divides the light into a sensing wave propagated into a second arm 26 of the coupler 24 (sensing fibre providing the sensing arm) and a reference wave propagated into a third arm 28 of the coupler 24 (reference fibre providing the reference arm). The sensing fibre 26 carries the sensing wave through an environment 32 in which the fibre 26 is exposed to a stimulus 36, possibly via one or more transducers 34, while the reference fibre 28 bypasses the environment 32. The two fibres 26, 28, or arms of the interferometer are brought together into a second optical coupler 38, in which the sensing wave and the reference wave are combined to provide the desired interference signal. The second coupler 38 can deliver the interference signal along the forward direction to one or two fibre output arms, for detection at one or two optical detectors 40a, 40b. As with the Michelson interferometer, the measurand might be temperature, pressure, strain or vibration, with transducers designed appropriately to transfer the effect of the parameter to the sensing fibre to imprint a level of the parameter onto the propagating sensing wave.

In a Michelson fibre interferometer or a Mach-Zehnder interferometer, either or both of the sensing arm and the reference arm can be constituted from antiresonant hollow core fibre, ARF, as disclosed herein. The other portions of optical fibre making up the optical circuit of the interferometer, such as those portions carrying light from the optical source and carrying light to the detector(s), may also be made from ARF according to preference. Note that a single type or design of ARF may be used for all the various parts of the optical circuit, or two or more different designs of ARF might be used in a single interferometer, as preferred. For example, an ARF could be deployed in the sensing arm by, for example, fusion-splicing an ARF between various sensing transducers, thereby effecting an optical path for the sensing wave which is free or largely free from thermal cross-sensitivity and other nonlinearities.

Figure 9:
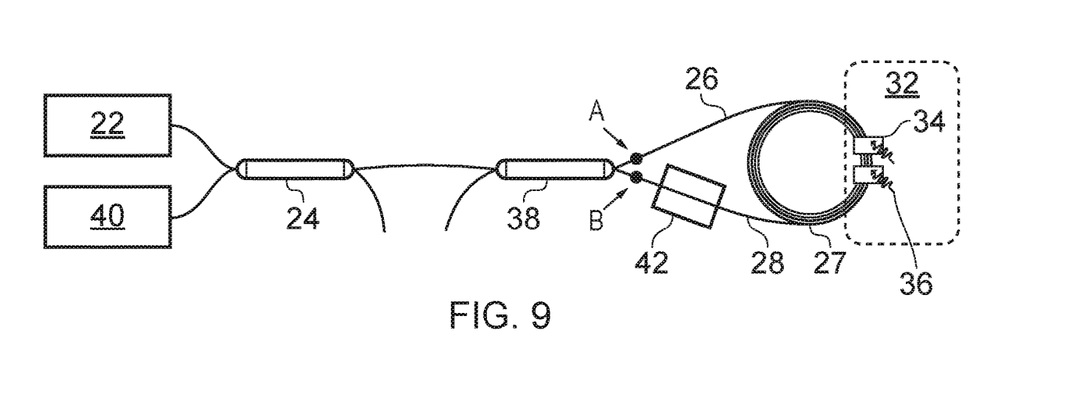
FIG. 9 shows a schematic diagram of an example fibre loop mirror type of optical fibre interferometer according to an embodiment.

FIG. 9 shows a simplified schematic diagram of an example of an interferometric sensor configured as a fibre loop mirror interferometer. It comprises an optical source 22, the output of which is passed through one or more optical couplers/splitters 24, 38 so as to divide the light into two forward propagating parts, providing the sensing wave and the reference wave. The second arm 26 and the third arm 28 of the second coupler 38 are (or are coupled to) the two opposite ends of a length of optical fibre which is wound into a coil or loop 27. Hence, the sensing wave launched into the second arm 26 and the reference wave launched into the third arm 28 counterpropagate around the coil 27. Hence, as before, an optical wave is split into signal and reference waves, but in this case the two waves enter a loop so that the signal wave propagates in one direction and the reference wave propagates in another direction. As with the Mach-Zehnder and Michelson interferometers of the FIGS. 6 to 8 examples, the length of fibre (loop 27) is carries the sensing wave to an environment 32 where it is exposed to a stimulus 36 whose magnitude is the desired measurand. Since the fibre is a loop 27 also carrying the reference wave, this is also exposed to the stimulus 36. The fibre loop has associated with it one or more transducers 34, which are elements configured to transduce the stimulus 36 into an optical phase or frequency shift which is imparted oppositely to the two counterpropagating waves. For example, the stimulus 36 may impart, via the transducer(s) 34 a positive phase or frequency shift to the wave propagating around the loop in the direction from point A to point B, while the same stimulus 36 and transducer(s) 34 impart a negative phase or frequency shift to the wave propagating in the opposite direction, from point B to point A. The counterpropagating waves exit the fibre loop 27, for recombination in the coupler(s) 38, 24 after their transit through the fibre loop 27, to give the desired interferometric signal detected at a detector 40 coupled to a fourth arm of the coupler 24. The intensity of the interferometric signal has proportionality to the differential phase shift between the two waves which in this case have transited the fibre loop 27 in opposite directions. Note that in this case, because the sensing stimulus 36 acts on both the sensing and reference waves but in opposite fashion, the phase or frequency difference is akin to those of the previously described interferometers.

Figure 10:
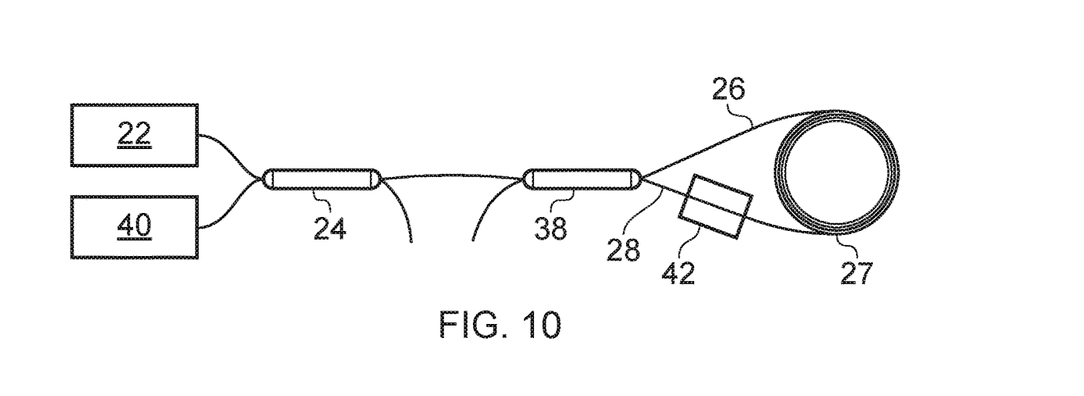
FIG. 10 shows a schematic diagram of an example interferometric fibre optic gyroscope according to an embodiment.

FIG. 10 shows a simplified schematic diagram of an example of an optical fibre interferometer configured as a fibre optic gyroscope, which is a particular example of a fibre loop mirror interferometer. In a fibre gyroscope, the fibre loop is wound in a coil such that the fibre windings lie substantially in the same plane. The sensing wave propagates in one direction through the loop (for example, in the clockwise direction when viewed from the coil winding axis) while the reference wave propagates in the opposite (counterclockwise or anticlockwise) direction to provide the required two counterpropagating waves. Angular rotation of the loop about its winding axis (or a component of angular rotation parallel to that axis) retards the phase of the wave propagating in the direction of rotation relative to that of the wave propagating oppositely to the rotation direction. The counter-propagating waves are recombined at the fibre loop entry point after transiting the fibre coil, to form the interference signal as usual. The difference between the phases of the counterpropagating sensing and reference waves, and thus the intensity of the interferometric signal, is proportional to the rate of angular rotation of the fibre loop. Hence, a fibre gyroscope is able to measure or detect angular rotation; motion of this kind, where the fibre coil is in a rotating environment, is the stimulus that acts on the sensing fibre to modify the sensing wave, and the interference signal carries information about the amount of angular rotation.

The example in FIG. 10 is an interferometric fibre optic gyroscope, or IFOG. It comprises an optical source 22, the output of which is passed through one or more optical couplers/splitters 24, 38 so as to divide the light into two forward propagating parts, providing the sensing wave and the reference wave. The second arm 26 and the third arm 28 of the second coupler 38 are (or are coupled to) the two opposite ends of a length of optical fibre which is wound into a coil or loop 27. Hence, the sensing wave launched into the second arm 26 and the reference wave launched into the third arm 28 counterpropagate around the coil 27, and any angular rotation of the coil 27 causes a relative phase delay to accrue between the two waves, according to the Sagnac effect. When each wave reaches the opposite end of the fibre making up the loop 27 it re-enters the coupler or couplers 38, 24 in the backward propagating direction so that the two waves are combined to form the interference signal. This is passed by the fourth arm of the first coupler 24 to a detector 40. The coil 27 or the splitter/coupler 38 at the ends of the loop 27 may include an integral phase modulator 42 in order to impart a biasing phase delay between the counterpropagating waves and thereby increase the sensitivity of the detected interference pattern.

Figure 11:
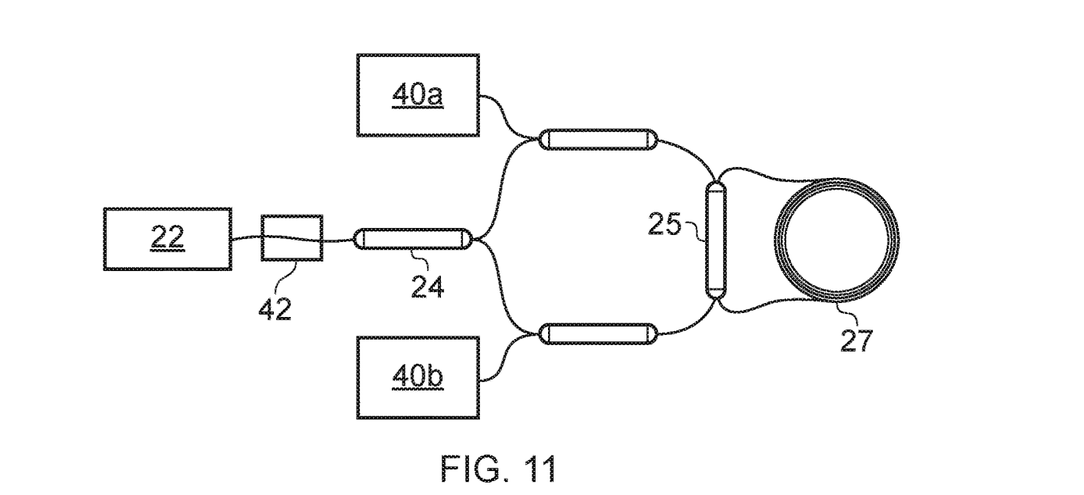
FIG. 11 shows a schematic diagram of an example resonant fibre optic gyroscope according to an embodiment.

FIG. 11 shows a simplified schematic diagram of a second example of an optical fibre interferometer configured as a fibre optic gyroscope. This example is a resonant fibre optic gyroscope, or RFOG. This device differs from an IFOG in that the optical waves are recirculated around the coil, in a resonant cavity. The two opposite propagation directions acquire a difference in resonance frequency if the coil is rotating, where the difference is proportional to the rate of angular rotation (of the coil, or of a component of rotation in the plane of the coil). In the illustrated example, an optical source 22 emits light emits light which is split by one or more couplers 24 into two forward propagating parts to provide sensing and reference waves, in second and third arms of the coupler 24. The signal and reference waves propagate to an additional optical coupler, being a resonance loop coupler 25 which serves to direct the two waves in opposite propagation directions into the ends of a fibre 27 coil. The resonance loop coupler 25 further serves to recirculate a fraction of the light returning from the coil 27 such that a portion of each of the two waves, having traversed the optical coil, is directed through the coil a second time, or a third time, and so on. Apart from the re-circulated portion, another portion of each wave returning from the fibre loop is directed out of the fibre loop 27 by the resonance loop coupler 25, and then out of the optical circuit of the interferometer by further couplers 38 and onto one of two resonance frequency detectors, 40a and 40b. One detector 40a detects the clockwise propagating wave, and one detector 40b detects the anticlockwise propagating wave, so the sensing wave and the reference wave are detected at separate detectors. The sensing wave collected at its resonance frequency detector arises from the interference of the many wavefronts which have co-propagated through the fibre loop, but crucially, for a different number of round-trips. When the fibre loop 27 is at rest, a resonance is observed at the optical frequency (inverse wavelength) wherein the optical path length of the fibre loop is equal to an integer number of wavelengths. However, under rotation of the fibre loop 27, this resonance frequency is shifted in proportion with the rate of angular rotation. Similarly, the reference wave collected at the other resonance frequency detector comprises interference between the multiply circulated portions of the wave, again forming a resonance. However, as the reference wave portions have traversed the fibre loop 27 in the opposite direction to the sensing wave portions, the frequency shift imparted by any rotation of the fibre loop 27 is opposite to that of the sensing wave, and thus the difference in the resonance frequencies at the sensing wave and reference wave detectors 40a, 40b is proportional to the rotation rate. In order to provide tracking of the resonance frequency at the signal and reference detectors, a frequency or phase modulator 42 may be employed on the light emitted from the optical source 22. Further phase or frequency modulators may be usefully employed either as an element within the recirculating loop, or within the sensing and reference branches prior to the light entry to the resonance loop coupler 25. These phase or frequency modulators may be used to provide a signal for the further refinement of the resonance frequency detection through feedback and optical frequency stabilization, or by imparting a biasing frequency shift.

In a fibre optic gyroscope such as an IFOG or an RFOG, or in a fibre loop mirror interferometer, the fibre coil 27 is formed from hollow core antiresonant fibre, ARF, as disclosed herein. The use of ARF for the sensing coil yields a fibre optic gyroscope (FOG) or other interferometer having superior accuracy, stability, and noise characteristics while enabling in a simple manner the benefits of a polarisation maintaining optical circuit which is required for a high performance interferometric sensor. The other portions of optical fibre making up the optical circuit of the interferometer, such as those portions carrying light from the optical source, carrying light to the detector, and carrying light between couplers, may also be made from ARF according to preference. Note that a single type or design of ARF may be used for all the various parts of the optical circuit, or two or more different designs of ARF might be used in a single interferometer, as preferred.

The optical source is operable to generate light at a wavelength which is at or near the antiresonant wavelength of the ARF, in other words, a wavelength which the ARF is able to propagate in its hollow core by antiresonant optical guidance.

To take maximum advantage of the polarisation maintaining performance of ARF, as described above, the components of the optical circuit that makes up the interferometer, such as couplers/splitters and modulators, may be configured to preserve polarisation states and/or extinguish unwanted polarisation states. It may also be beneficial to employ an optical source that emits only a single linear polarisation state. The optical circuit may include particular polarisation-maintaining elements. However, the disclosure is not limited in this regard: an unpolarised source may be used, and the interferometer optical circuit may lack polarisation-maintaining or preserving components.

ARF may also be used in interferometric optical fibre sensors configured differently from the examples of FIGS. 6 to 11; the present disclosure is not limited to the illustrated configurations. Also, interferometric optical fibre sensors that utilise ARF to carry one of both of the sensing and reference optical waves may be included within any product, device or apparatus that incorporates a fibre interferometer, of which a great number and variety will be apparent to the skilled person. The use of ARFs in such devices can provide substantial benefits in improved stability and accuracy and reduced noise compared to sensors in which performance is limited by undesirable effects arising in solid core fibres and HCPBF such as thermal phase variations, non-linear effects and polarisation mode coupling.

In the foregoing description, the terms "sensing wave" and "reference wave" have been used to describe the operation of various fibre interferometric sensors, in all of which a first and a second wave are propagated. These terms should not be understood as limiting, however. In some forms of interferometer, where the two waves are carries in different lengths of optical fibre, the measurand or stimulus affects only one of the waves, which can therefore be considered as a "sensing wave", or a "signal wave", for convenience. The other wave does not undergo any modification from the stimulus, so might be considered as a reference wave, again for convenience. In other interferometer designs, in particular those employing a fibre loop or coil, both waves are carried by the same length of optical fibre (albeit in opposing propagation directions), so that both waves experience the relevant stimulus, which has an opposite effect on the two waves. However, it is still important to distinguish the two waves, so we can still term them as a sensing or signal wave, and a reference wave, for clarity. In general, therefore, the interferometers carry a first wave and a second wave, at least one of which is acted on by the stimulus or measurand of interest; the other may or may not be acted on. In either case, the difference between the two waves after action of the stimulus is detected, measured or otherwise deduced or determined (interference signal), and this indicates a magnitude of the stimulus. Either or both of the first wave and the second wave can be propagated in ARF.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] U.S. Pat. No. 7,911,620
[2] U.S. Pat. No. 7,180,598

[3] US 2016/0252673 A1
[4] Francesco Poletti, "Nested antiresonant nodeless hollow core fiber," Opt. Express, 2014, vol. 22, pp. 23807-23828
[5] John R. Hayes et al, "Antiresonant hollow core fiber with an octave spanning bandwidth for short haul data communications", Journal of Lightwave Technology, 2016, vol. 35, no. 3, pp 437-442 (DOI: 10.1109/JLT.2016.2638205)
[6] M. B. S Nawazuddin et al, "Lotus-shaped negative curvature hollow core fiber with 10.5 dB/km at 1550 nm wavelength", Journal of Lightwave Technology, 2017, vol. 36, no. 5, pp 1213-1219 (DOI: 10.1109/JLT.2017.2787197)
[7] C. Röhrer et al, "Polarization maintaining behaviour of hollow-core fibers", Ultrafast Laser Sources and Optics/Beam Delivery for High Power Ultrafast Lasers, Stuttgart Laser Technology Forum (SLT) 2018, page 28, 5-6 Jun. 2018.
[8] U.S. Pat. No. 7,751,055

The invention claimed is:

1. A resonant fibre optical gyroscope (RFOG), comprising:
an optical resonator coil comprising a first coil port and a second coil port;
wherein the optical resonator coil comprises a hollow core optical fibre, wherein the hollow core optical fibre comprises a tubular outer jacket comprising an inner surface, a hollow core, and a cladding, wherein the cladding comprises a plurality of glass cladding capillaries, wherein the hollow core is bounded by inwardly facing portions of outer surfaces of the plurality of glass cladding capillaries, wherein the plurality of glass cladding capillaries are arranged in a ring around the hollow core, and wherein each cladding capillary is bonded to the inner surface of the tubular outer jacket;
a resonance loop coupler optically coupled to the first coil port and the second coil port;
a laser system optically coupled to the resonance loop coupler and configured to generate a clockwise (CW) optical signal configured to propagate around the optical resonator coil in a clockwise direction and (b) a counterclockwise (CCW) optical signal configured to propagate around the optical resonator coil in a counterclockwise direction, wherein each of the CW optical signal and the CCW optical signal have a wavelength which the hollow core optical fibre is configured to guide by an antiresonant optical guidance effect;
a CW detector optically coupled to the resonance loop coupler and configured to detect a portion of the CW optical signal emitted, through the resonance loop coupler, from the optical resonator coil; and
a CCW detector optically coupled to the resonance loop coupler and configured to detect a portion of the CCW optical signal emitted, through the resonance loop coupler, from the optical resonator coil;
wherein rotation of the optical resonator coil around winding axis of the optical resonator coil creates a difference between a CW resonance frequency of the CW optical signal and a CCW resonance frequency of the CCW optical signal, and wherein the difference between the CW resonance frequency and the CCW resonance frequency is proportional to a rate of angular rotation around the winding axis;
wherein each of the CW optical signal and the CCW optical signal are linearly polarized in the hollow core optical fibre, and wherein the hollow core optical fibre has a holding parameter value of less than $1 \times 10^{-5}$ m$^{-1}$, or less than $1 \times 10^{-6}$ m$^{-1}$, or in a range of $1 \times 10^{-6}$ m$^{-1}$ to $1 \times 10^{-5}$ m$^{-1}$, or in a range of $1 \times 10^{-7}$ m$^{-1}$ to $1 \times 10^{-6}$ m$^{-1}$, or in a range of $1 \times 10^{-7}$ m$^{-1}$ to $1 \times 10^{-5}$ m$^{-1}$.

2. The RFOG of claim 1, wherein outer surfaces of adjacent cladding capillaries are spaced apart from one another around the inner surface of the tubular outer jacket, and are not in contact.

3. The RFOG of claim 1, further comprising one or more secondary cladding capillaries bonded to the inner surface of each cladding capillary.

4. The RFOG of claim 3, further comprising one or more tertiary cladding capillaries bonded to the inner surface of each of the one or more secondary cladding capillaries.

5. The RFOG of claim 1, comprising cladding capillaries of more than one cross-sectional size or shape.

6. The RFOG of claim 1, in which the hollow core optical fibre has a transverse cross-sectional structure with rotational symmetry at one or more angles less than 180°.

7. The RFOG of claim 1, in which the hollow core optical fibre has a transverse cross-sectional structure including a feature or features which differ along two orthogonal transverse axes.

8. The RFOG of claim 7, in which the feature which differs along two orthogonal transverse axes is a wall thickness of the plurality of glass cladding capillaries, such that cladding capillaries with a first wall thickness are positioned on a first transverse axis and cladding capillaries with a second wall thickness different from the first wall thickness are positioned on a second transverse axis orthogonal to the first transverse axis.

9. The RFOG of claim 8, in which the first wall thickness determines a first wavelength at which the hollow core optical fibre is configured to guide by the antiresonant optical guidance effect and the second wall thickness determines a second wavelength at which the hollow core optical fibre is configured to guide by the antiresonant optical guidance effect;
wherein a CW wavelength of the CW optical signal and a CCW wavelength of the CCW optical signal are each between the first wavelength and the second wavelength.

10. A method of sensing a rotation rate around a winding axis of an optical resonator coil comprising a hollow core optical fibre, the method comprising:
propagating a clockwise (CW) optical signal, which is linearly polarized, in the hollow core optical fibre and around the optical resonator coil in a clockwise direction;
propagating a counterclockwise (CCW) optical signal, which is linearly polarized, in the hollow core optical fibre and around the optical resonator coil in a counterclockwise direction, wherein the hollow core optical fibre comprises a tubular outer jacket comprising an inner surface, a hollow core, and a cladding, wherein the cladding comprises a plurality of glass cladding capillaries, wherein the hollow core is bounded by inwardly facing portions of outer surfaces of the plurality of glass cladding capillaries, wherein the plurality of glass cladding capillaries are arranged in a ring around the hollow core, wherein each cladding capillary is bonded to the inner surface of the tubular outer jacket, and wherein the hollow core optical fibre has a holding parameter value of less than $1 \times 10^{-5}$ m$^{-1}$, or less than $1 \times 10^{-6}$ m$^{-1}$, or in a range of $1 \times 10^{-6}$ m$^{-1}$ to $1 \times 10^{-5}$ m$^{-1}$, or in a range of $1 \times 10^{-7}$ m$^{-1}$ to $1 \times 10^{-6}$ m$^{-1}$, or in a range of $1 \times 10^{-7}$ m$^{-1}$ to $1 \times 10^{-5}$ m$^{-1}$;

determining a CW resonance frequency of the optical resonator coil in the CW direction;

determining a CCW resonance frequency of the optical resonator coil in the CCW direction; and determining a rate of rotation around the winding axis of the optical resonator coil based upon a difference between the CW resonance frequency and the CCW resonance frequency.

\* \* \* \* \*